Oct. 18, 1966   F. DE SENIGON DE ROUMEFORT   3,279,626
CONTROL DEVICE FOR A MECHANICAL GARAGE
Filed Jan. 14, 1964                        7 Sheets-Sheet 1

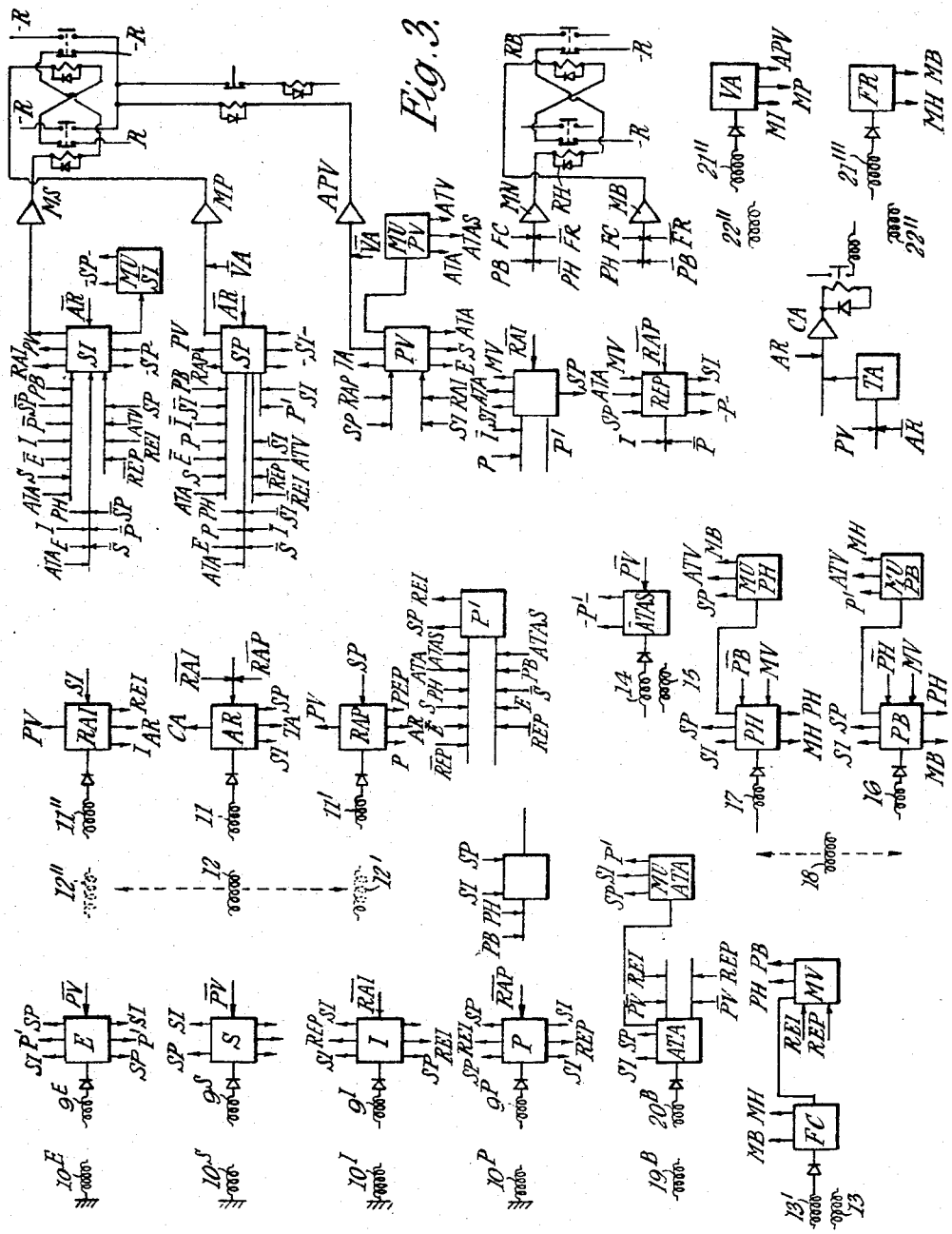

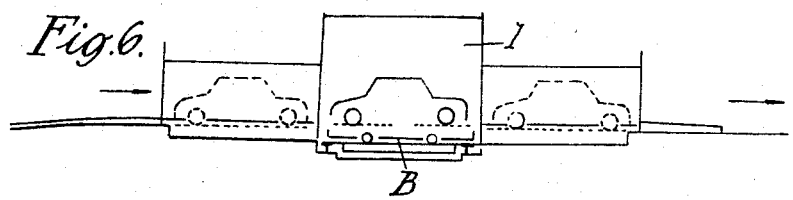
Fig. 6.
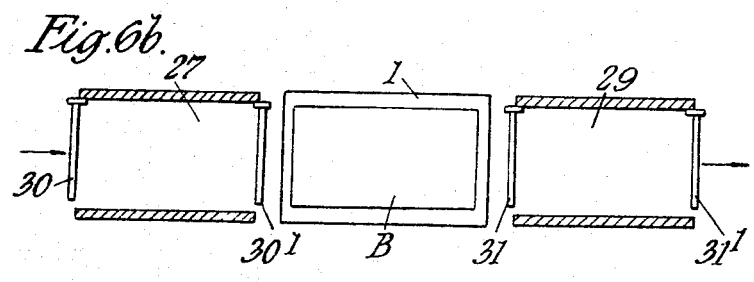
Fig. 6b.
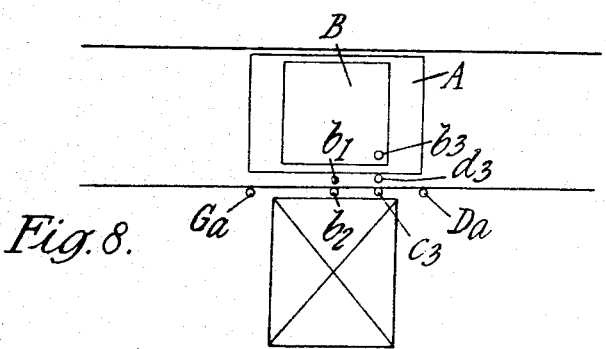
Fig. 8.
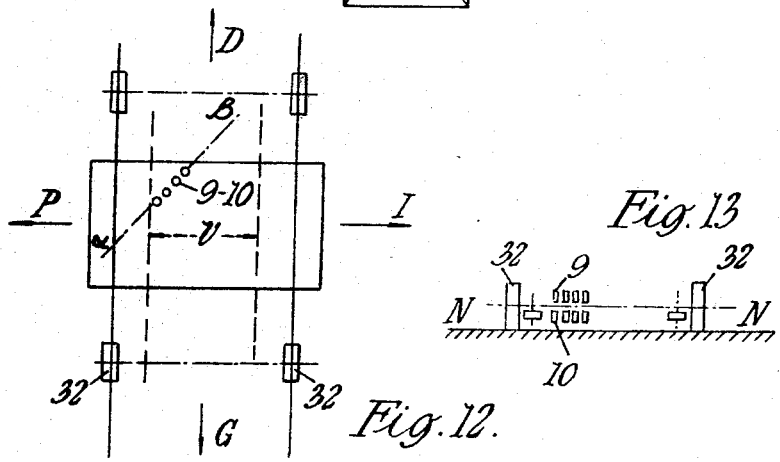
Fig. 13.
Fig. 12.

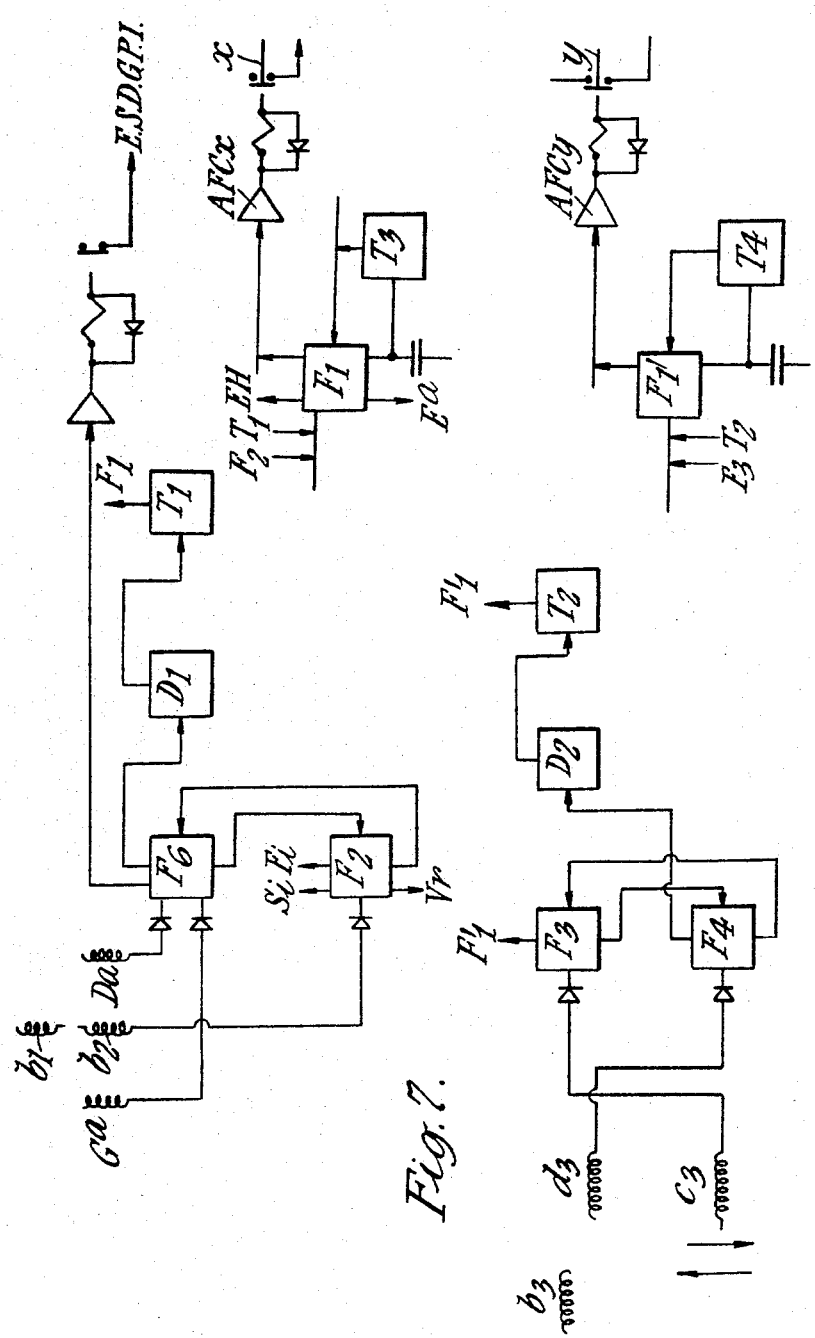

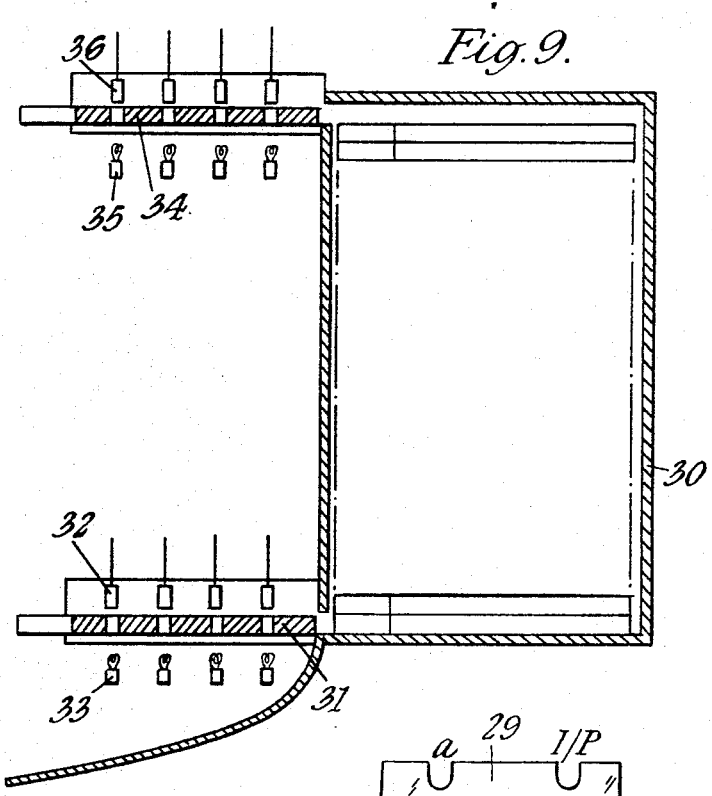

United States Patent Office 3,279,626
Patented Oct. 18, 1966

1

3,279,626
CONTROL DEVICE FOR A MECHANICAL
GARAGE
Francois de Senigon de Roumefort, Paris, France, assignor to Motoparks Limited, London, England
Filed Jan. 14, 1964, Ser. No. 337,557
Claims priority, application France, Jan. 21, 1963, 921,996
19 Claims. (Cl. 214—16.1)

Mechanical garages are already known in which the vehicles are taken on the ground by a vehicle lift which carries them to the various floors, at which a main trolley moving longitudinally and combined with an auxiliary trolley moving transversely, provided in turn with a vehicle-carrying platform, transports the vehicle into the selected compartment.

In the greater part of the devices of this kind which already exist, the various movements are usually controlled by successive orders given by an operator from the central control station. However, it is desirable to obtain fully automatic operation, that is to say to initiate by a single action the complete cycle of operations, either of entry of a vehicle and its conveyance into the desired compartment, or bringing out a vehicle previously garaged in one of the compartments. This fully-automatic operation is difficult to achieve.

It is an object of this invention to provide a device to enable the automation of mechanical garages to be increased. It is another object of this invention to provide a device which makes it possible to simply the control circuits in a mechanical garage. It is yet another object of this invention to provide a device which makes it possible to effect temporary prohibitions of certain movements in order to eliminate completely all risk of errors in operation. It is a further object of this invention to provide a device which makes it possible to avoid the use of mechanical relays, which themselves often cause failure, especially due to wear of the working parts or to getting out of order.

This invention consists in a device for the automatic control of transporting means for transporting vehicles in a mechanical garage, the device having receiving means arranged to be sensitive to signals emitted by emitter means, the receiving means being connected with relays arranged to be connected in turn with means for driving the transporting means, and the device being arranged to receive signals through the receiving means, and, through the intermediary of the relays, actuate the driving means in response to these signals so as to enable the various transporting movements to be carried out automatically. The receiving means would normally be arranged to be mounted on the transporting means, so as to receive signals from fixed emitter means.

The receiving means may be electromagnetic receiving coils for receiving signals from electromagnetic emitter coils. The relays may be static relays having transistors in trigger connection. The relays may have a memory device arranged for retaining signals received by the receiving means, and for distributing the signals subsequently to the driving means; thus the device may include relays for controlling movements of the transporting means from an initial waiting position and for effecting the return of the transporting means to the waiting position. The device may include relays for controlling the

2 driving means, and other relays for supplying the controlling relays with a plurality of orders, these other relays being arranged to correspond to prohibitions or permissions for operation and being grouped together in "AND" functions, which may be multiple and may constitute a group of "OR" functions. The relay controlling the movement of any driving means, e.g. for translation of the trolleys, or raising or lowering the jacks or lift, may be arranged to be subordinated to permission given by the driving means which has carried out the preceding movement.

The receiving means may be arranged to be mounted on transporting means comprising a main trolley carrying an auxiliary trolley movable in a direction transverse to the movement of the main trolley, the auxiliary trolley having a vertically-movable support surface for bearing a vehicle and the receiving means being arranged to receive signals from fixed emitter means.

The device may include receiving means arranged to be mounted on the auxiliary trolley and to receive a signal from emitter means either carried by the main trolley or located in a compartment of the mechanical garage, this receiving means being connected to relays capable of recording the signals corresponding to the movements to be carried out, and of retaining them in memory in order to actuate the driving means of the auxiliary trolley at the desired moments.

The device may include receiving means and relays for controlling the movements of the main trolley in response to signals received from emitter means forming part of a group of four fixed emitter means, e.g. coils supplied with alternating current, namely the emitter means of the entry cycle, of the exit cycle, of the right-hand and of the left-hand, and also receiving means and relays for slowing down the main trolley on the right-hand side, slowing down the main trolley on the left-hand side and/or stopping the main trolley in response to fixed emitter means adjacent to or in compartments of the mechanical garage. This device may further comprise receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley. The device may comprise emitter means arranged to be mounted on the main trolley and to be controlled by a static relay recording the stopping of the main trolley, for authorising the movement of the auxiliary trolley by means of a corresponding receiving means carried by the auxiliary trolley. The device may comprise relays, arranged to be mounted on the main trolley, for recording, from the first movement (beginning of the cycle) away from the waiting position, the orders necessary for carrying out the return movement to the waiting position, but only after the cycle of movements of the auxiliary trolley has been completed and with all the interlocks on the one hand and the authorisations on the other; by suitable arrangement, this can provide complete safety of operation; thus the main trolley may comprise static relays for returning the main trolley to the waiting position, these relays giving an order in an "AND" function conjointly with a permission function of the auxiliary trolley, transmitted by a relay for carrying out this permission function. The device may include receiving means and relays for controlling the movements of the auxiliary trolley in response to signals received from emitter means forming part of a group of four fixed emitter means, e.g. coils supplied with alternating current, namely the emitter means of the entry cycle, of the exit cycle, of the odd-numbered compartments and of the even-numbered compartments, and may also comprise receiving means arranged to be mounted on the auxiliary trolley for receiving signals from an emitter means mounted on the main trolley and from fixed emitter means mounted in compartments of the mechanical garage, for slowing down the transverse movement of the auxiliary trolley in either direction and for stopping the auxiliary trolley.

The device may have relays and an end-of-travel receiving means arranged to control the upward or downward movements of jacks for raising and lower the support surface of the auxiliary trolley; thus the device may comprise receiving means arranged to be mounted on the auxiliary trolley for receiving a signal from emitter means provided at the back of each compartment and of the lift, for actuating relays controlling the movement of the jacks of the support surface. The device may comprise emitter means arranged to be fixed in relation to the support surface and two end-of-travel receiving means arranged to be mounted one in the upper part and the other in the lower part of the travel of the support surface for supplying control relays for the driving means of the jacks, the latter control relays being arranged to be actuated in an AND function by the orders of a relay controlled by fixed emitter means at the back of a compartment, and prohibition safety relays. The device may include control relays for the driving means of the auxiliary trolley these control relays being connected so as to be subjected to permission to move given by a relay controlling the definite stopping of the driving means for the jacks. The device may include receiving means and a relay arranged to be mounted on the auxiliary trolley to receive a signal from emitter means mounted in a lift of the mechanical garage, and include relays arranged to be excited by either the high or the low position relays of the jacks, the receiving means connected to these relays being arranged to be influenced by the emitter means arranged to be fixed in relation to the support surface, the relays being arranged to give permission simultaneously in an AND function to control relays for the auxiliary trolley driving means.

The device may include emitter means arranged to be mounted on the auxiliary trolley for giving a signal to receiving means fixed to the frame of a lift of the mechanical garage, for verifying the final exit movements of the auxiliary trolley from the lift; these emitter and receiving means may be arranged to permit any other desired signalling operation to be effected.

The garage may be arranged such that multiple orders required for carrying out a cycle of operation of the transporting means can be transmitted from a control panel to fixed emitter means arranged opposite the initial waiting position of the transporting means, the transporting means being provided with receiving means which, in the waiting position, are in proximity to the fixed emitter means, and which, through the intermediary of relays and amplifiers, are associated with contactors of circuits of the driving means of the transporting means. Fixed emitter means may be mounted adjacent to each compartment, the transporting means including receiving means for receiving a signal from the fixed emitter means and arranged to effect slowing down and stopping of the transporting means when the signal is received due to the emitter and receiving means coming into proximity or coincidence.

If the transporting means comprises a main trolley carrying an auxiliary trolley in the manner indicated above, more than one emitter means may be provided on a floor of the garage for transmitting signals to receiving means mounted on the transporting means, the emitter means lying on a straight line at 45° to the axis of movement of the main trolley; the fixed emitter means must necessarily occupy a strictly defined position such that during the two movements to which the auxiliary trolley is subjected, longitudinal in conjuction with the main trolley and alone in a transverse direction, there is never any interference of flux from an emitter means on another receiving means which does not correspond to the recording of the order transmitted; the most suitable position is the straight line at 45° to the axis of movement of the main trolley.

The garage may incorporate a magazine, the magazine being arranged such that the extraction of a key from, or the insertion of a key into, the magazine automatically initiates and causes to complete a cycle for placing a vehicle into a compartment, or removing a vehicle from a compartment, respectively, the magazine being coupled by relays to contactors for controlling the opening or closing of circuits of the fixed emitter means. The magazine may include a plurality of photoelectric cells, and means for directing light onto these cells, whereby the placing or removing cycles can be initiated and caused to complete by removing or extracting a key having cut-away portions and full portions adapted to permit or intercept the passage of the light directed onto individual photoelectric cells.

The compartments of the garage may be divided into groups located on the one hand on the odd- or even-numbered side of a central passageway and on the left-hand or right-hand side of the waiting position, the magazine being connected on the one hand to a relay delivering, in the working and rest positions, to contactors connected to the emitter means of the group of right-hand and left-hand compartments, respectively (or vice versa), and on the other hand to a relay delivering, in the working and rest positions, to contactors connected to the emitter means of the group of odd and even-numbered compartments, respectively (or vice versa). This arrangement can permit the whole of one floor of the garage to be divided into four sectors with respect to the axis of the lift, while selecting a single compartment of a single sector and simultaneously exciting the fixed compartment emitter means of the symmetrical compartments on each side, right-hand and left-hand, even-numbered and odd-numbered, and this arrangement makes it possible to simplify the equipment and the number of operations required. The garage may have four groups of seven compartments, the magazine being connected to three relays, in order to select a compartment from a group of seven compartments, the output circuits of these relays, either working or at rest, being connected in groups of three forming AND functions to as many contactors as there are compartments in the group which in turn control the compartment emitter means.

The magazine may be arranged such that the keys are inserted at one end, which operation records through sensitive elements the movement orders relative to outgoing vehicles, and extracted at the other end, which operation records the orders relative to incoming vehicles; in this manner, all the keys contained in the magazine can correspond to free compartments.

The garage may have a plurality of floors, the magazines being formed into a group, each magazine being allocated to one floor or to a certain number of compartments.

The mechanical garage may include one or more entrance/exit compartments having a barrier at each of their ends, the opening of one barrier being arranged to cause the closure of the other barrier and vice versa, and the opening of the barrier which gives access to the lift being arranged to call the lift, the entrance/exit compartments being situated such that vehicles pass through them on entering and leaving the garage. The barriers may be coupled to current switches arranged to ensure that the device is put out of action when a vehicle exceeds a limiting dimension of length, width or height.

The mechanical garage may include an entry platform on which a vehicle may be placed by a driver and automatic transport means, such as a trolley, having universal movement for transporting the vehicle from the entry platform up to and into the lift.

The invention will be further described, by way of example, with reference to the accompanying drawings, which relate to a mechanical garage, and of which:

FIGURE 3 is a diagrammatic view of the whole of the electric control equipment of the transverse-movement auxiliary trolley;

FIGURES 6 and 6b are diagrammatic views in elevation and plan of the loading or unloading of the vehicles into and out of the lift, by a mechanical device;

FIGURE 7 is a control diagram of certain operations of the lift and of signalling;

FIGURE 8 is a partial diagrammatic view showing especially the arrangement of the emitter coils of the lift;

FIGURE 9 is a diagrammatic view in vertical section of a device for storing the control and order issuing keys;

FIGURE 9b is a view of a key corresponding to the device of FIGURE 9;

FIGURE 10 is a diagrammatic view of the distribution and numbering of the compartments of one floor;

FIGURES 12 and 13 are partial diagrammatic views showing a preferred arrangement of the coils relating to the traverse movement auxiliary trolley.

Figure 1:
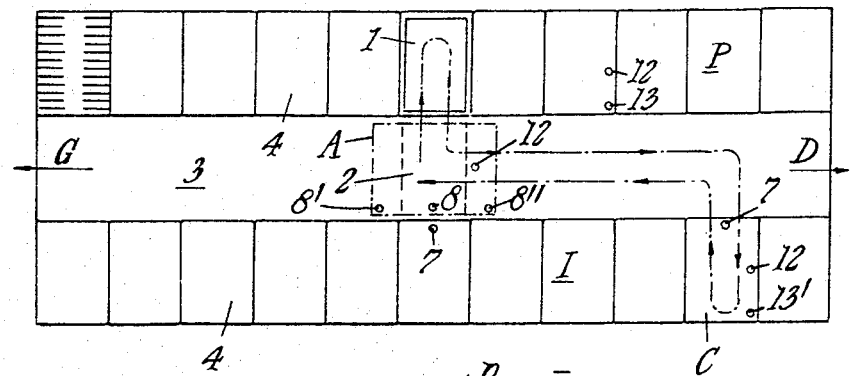
FIGURE 1 is a diagrammatic plan view of one floor of the garage.

In the embodiment shown in the drawings, it has been assumed that each floor comprises a longitudinal passageway 3, serving a plurality of compartments 4 arranged on each side.

The lift 1 which serves the floor occupies the position of one of the compartments. As has already been described in French Patent No. 1,128,976 (to which British Patent Number 830,418 in part corresponds), the transport of the vehicles to the selected compartment is effected by means of a main trolley (which will hereinafter be known as "trolley A" moving in the longitudinal passageway 3, with which is combined an auxiliary trolley (hereinafter known as "trolley B") carried by the first trolley for longitudinal movements, and which ensures the transverse movements for entering and leaving the parking compartments or the lift compartment.

The upper portion of this trolley B is formed by a platform which can be given a vertical movement upwards or downwards by means of jacks (not shown) actuated by a suitable motor of any kind, this arrangement permitting a vehicle to be lifted from or placed on the supports (constituted by juxtaposed tubes) of the compartments or of the lift. The platform supporting surface need not be planar and may be formed by a series of supporting members.

The particular arrangement of rolling tracks for the trolleys A and the supports in the compartments can be in particular the same as described in French Patent No. 1,128,976.

The automatic control device according to the present invention provides that at each floor, all the movements of the transporter trolleys A and B are effected from a predetermined position such as 2 (FIGURE 1), hereinafter termed the waiting position. In this case, the lift occupies the position of one of the compartments so that the operations of entering and leaving the lift are effected by movements of the trolley B similar to those carried out for any of the parking compartments. Starting from the initial position 2, the transporter trolleys automatically carry out the series of movements which have been detailed above, by means of the control equipment which will be described later, thus following, in the case of an ingoing vehicle, the path shown in chain-dotted lines in FIGURE 1.

As the driving motors for driving each of the trolleys, there will preferably be employed a unit consisting of two squirrel cage rotors mounted on the same shaft and associated with two corresponding stators, one with a small number of poles for the higher speed and the other with a larger number of poles for the idling speed, the interruption of the supply to the first, simultaneously with the application of the supply voltage to the second, generating a powerful braking effect due to rotor reaction.

All the controls are grouped together in a central station, and the selection of the compartment is effected by these controls as will be described later with reference to FIGURES 9 to 11, this central station being associated with the following elements:

(a) Four fixed magnetic emitter coils arranged (on the floor in question) opposite the initial position 2 of the trolley A; the trolley A is provided with four corresponding receiving coils intended to be excited by proximity;

(b) Four further fixed magnetic emitter coils arranged (for the floor in question) opposite the trolley B in its waiting position on the trolley A; the trolley B is provided with four corresponding receiving coils intended to be excited by proximity.

The position of these fixed coils is normally of very great importance in the embodiment shown in the drawings, they are arranged along a line forming an angle of 45° with the two axes of movement of the trolley B, in order to prevent any interference with respect to each other;

c) and for the compartment corresponding to the ordinate control, fixed coils which co-operate during the course of the movement with receiving coils mounted respectively on trolleys A and B.

All these fixed coils are emitters and are energized by alternating current; they induce by proximity a current in the receiving coils mounted on the trolleys, this current being rectified by a diode and serving, through the intermediary of a number of relays, to control the movements of the driving members of the trolleys and the jacks.

Figure 2:
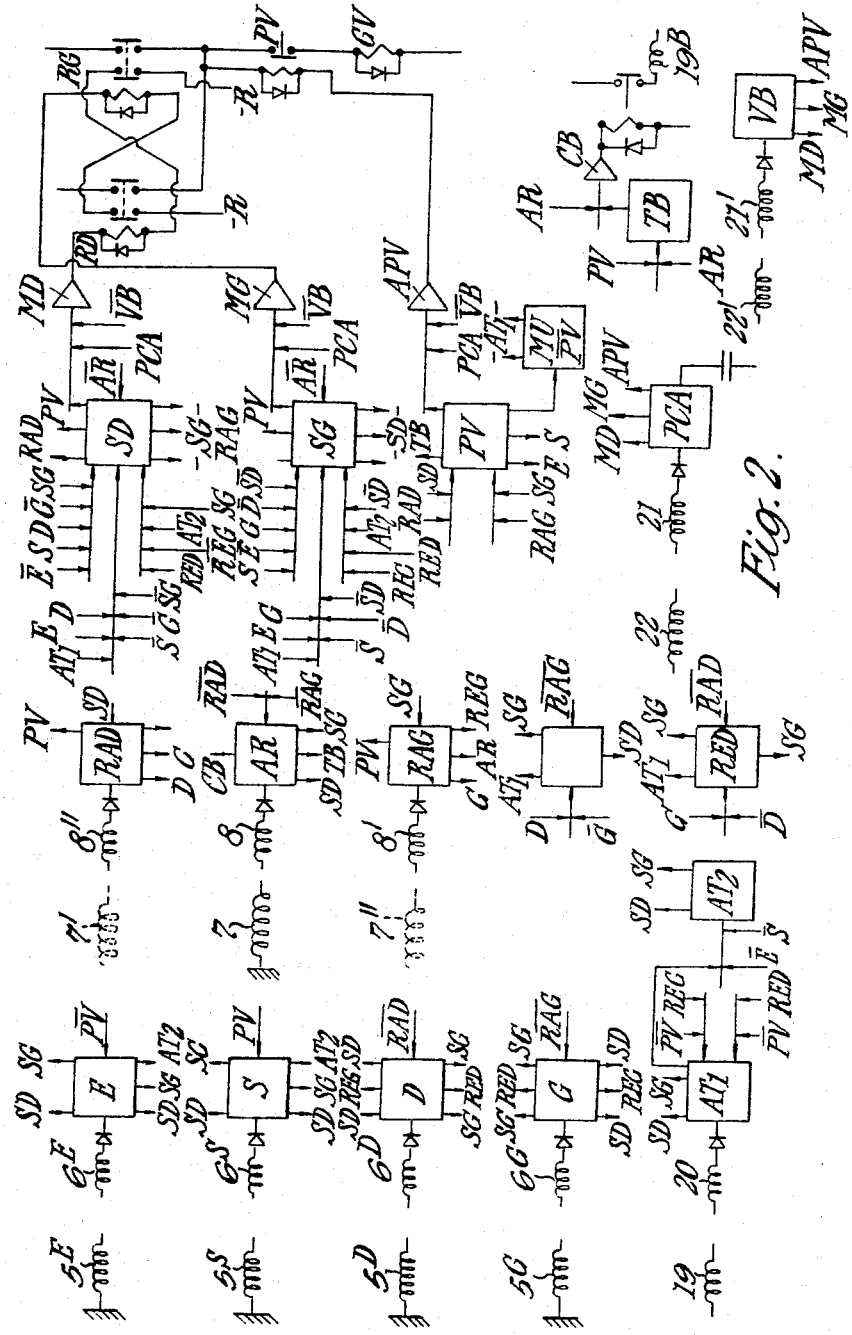
FIGURE 2 is a diagrammatic view of the whole of the electric control equipment of the main trolley.

Referring to FIGURES 2 and 3 of the accompanying drawings, it can be seen that there are four emitter and four receiving coils for the trolley A (FIGURE 2), and these coils are respectively associated with the controls of the following movements:

Entry of a vehicle: $5^E$ and $6^E$.
Departure of a vehicle: $5^S$ and $6^S$.
Longitudinal movement towards the right-hand side D (FIGURE 1): $5^D$ and $6^D$.
Longitudinal movement towards the left-hand side G (FIGURE 1): $5^G$ and $6^G$.

The compartment entrance coil is shown at 7 and the corresponding receiving coils on the trolley A are shown at 8, 8' and 8". The positions of the coil 7 are shown at 7' and 7" when it is opposite the receiving coils 8' or 8".

The emitter and receiving coils for the trolley B (FIGURE 3) are:

Vehicle entering: $10^E$ and $9^E$.
Vehicle leaving: $10^S$ and $9^S$.
Odd-numbered compartments: $10^I$ and $9^I$.

Even-numbered compartments: 10$^P$ and 9$^P$.
Coil for front of compartment: 13.
Corresponding coil on trolley B: 13'.

In addition, an emitter coil 12 is fixed on the trolley A and in each of the compartments, as well as in the lift cabin, in order to regulate the movement of the trolley B by means of the receiving coils, at 11 for stopping and 11' or 11" for slowing-down, depending on the direction of movement.

The reference 12' and 12" represent the positions of the coil 12 with respect to the two other coils.

The receiving coils are connected in turn to static relays of the trigger-circuit transistor type. In order to facilitate ready understanding of the invention, and although such relays are known per se and do not form part of the invention, a diagram of the relay has been given by way of example in FIGURE 4, of the accompanying drawings.

A relay of this kind is constituted by two transistors $T_1$ and $T_2$ mounted in flip-flop or trigger connection. This relay is in the position of rest when, in the absence of any control signal applied at $c$, $T_1$ is conductive while $T_2$ is blocked; the relay then supplies a negative current at $n$. When a signal is introduced at $c$, the transistor $T_1$ is blocked, the base of $T_2$ becomes negative and $T_2$ becomes conductive. It is then said that the relay has triggered to its working position. It then delivers current towards $p$. This relay can be locked in the working position resulting from this trigger action by introducing a direct-current potential at $v$; thus, as long as this locking potential (also known as self-supply) is maintained, the control injected at $c$ is stored in a memory by the relay in order to be carried out subsequently.

All the similar relays employed in the automatic control herein described are shown by squares in which is inscribed the abbreviated reference of the function of the relay concerned.

Figure 4:
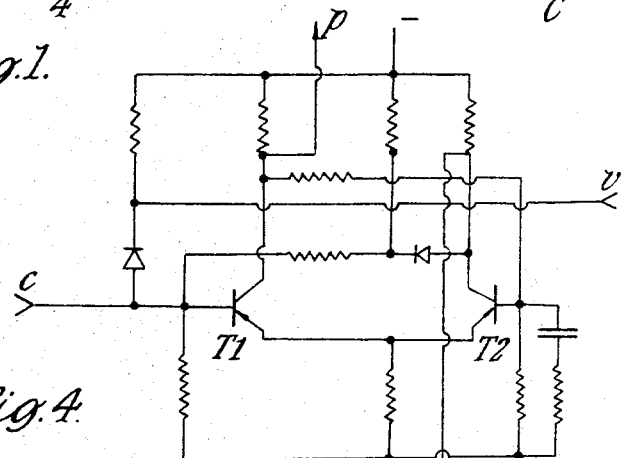
FIGURE 4 is a diagram of a static relay utilized in a garage.
Figure 5:
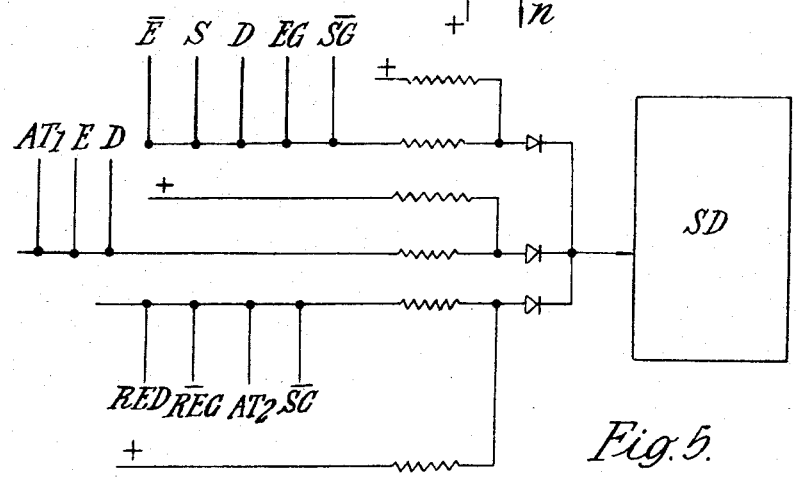
FIGURE 5 shows a diagram of the operations of a relay for performing an "OR" function and "AND" functions.

The referenced horizontal lines entering horizontally from the left-hand side of these squares correspond to connections over which the orders arrive (similar to $c$ of FIGURE 4); the horizontal lines entering from the right-hand side correspond to locking voltages (similar to $v$ of FIGURE 4); the vertical lines passing out of the upper portion correspond to the current outputs delivered in the working position (similar to $p$ of FIGURE 4), and the vertical lines passing out from the lower portion correspond to the current outputs in the rest position (similar to $n$ of FIGURE 4). It is clear that these inputs and outputs may be as numerous as desired on each face, a multiplier device being employed when so required. All these relays are supplied with direct current, for example at 24 volts, and these supply circuits have not been shown in the drawings in order to avoid useless complication of the diagrams.

In the diagrams of FIGURES 2, 3, 7 and 11, the form of representation employed (which is coming into general use in the electronic technique) avoids complication of the drawings by not showing the connections between the various components, showing only for each relay (or similar element) the outgoing conductors which are connected to it, with a reference indicating the element at which the other extremity of this conductor terminates. This reference is surmounted by a horizontal line in the case where the element (another relay for example) at which the conductor terminates is in the position of rest.

Thus, the various relays E, S, D, G (FIGURE 2) are in turn connected to the driving members of trolley A through the intermediary of two relays which respectively control the direction of running, towards the right (SD) and towards the left (SG). The the latter are in turn connected through the amplifiers MD and MG to mechanical contactors controlling the circuits of the said motors.

These relays SD and SG should only release the driving movements when all the required conditions are satisfied.

Three OR functions are each represented by a corresponding horizontal line for the relay SG, which means that the relay can be controlled following three different cycles of operations, and each of these represents an AND function shown by a plurality of vertical lines; the whole of these conditions must be obtained in order that a signal may pass along the horizontal line considered. This method of representation is known. However, for the sake of clearness, the detail of the connections of the inputs to the relay SD, chosen as an example, has been shown.

This same method of representation has been adopted in the accompanying drawings for all the complex AND or OR controls.

The table below gives the functions of the various elements of the main trolley A (relays or amplifiers) indicated in FIGURE 2 of the drawings by their references:

E: Preparation for vehicle entering the compartment.
S: Preparation for removing a vehicle from the compartment.
D, G: Preparation for right-hand or left-hand movement, trolley A.
AT$_1$, AT$_2$ Permission for movement given by trolley B to trolley A.
SD, SG: Control of direction of movement, right-hand or left-hand.
MD, MG: Amplifiers for reversing the phases on the two speeds.
RED, REG: Preparation of the return control towards the right or towards the left.
RAD, RAG: Control of slowing-down (with PV and APV) upon arrival in front of the compartment.
AR: Control of complete stoppage.
PCA: Checking of correct position of trolley B on A.
CB: Control authorization given to B to move into the interior of the compartment.
VB: Checking of the interrupted supply to the motors of trolley B.

It is important to note that the fixed emitter coils which transmit to the auxiliary trolley the orders relative to the "entering-leaving-odd-numbered compartments even-numbered compartments" are compelled to occupy a strictly determined position, sufficiently distant from each other and followng the straight line which forms an angle of 45°, both with the longitudinal axis and the transverse axis of the movements of the auxiliary trolley, in order to prevent, during the movements, any interference or mixture between the fluxes of the emitter coils and the perfectly determined fluxes of the corresponding receiving coils.

To this end, the fixed emitter coils such as 10$^E$, 10$^S$, 10$^I$ and 10$^P$ associated with trolley B are arranged substantially at the level N of the floor in a position U located inside and at a sufficient distance from the travelling rollers 32 of trolley A (FIGURE 12 and 13), and the receiving coils of trolley B, such as 9$^E$, 9$^S$, 9$^I$ 9$^P$ are arranged in a higher but adjacent plane. These two groups of coils are further arranged in plan along a line inclined at 45° to the axis of the transverse movement.

This arrangement permits good conditions of coincidence to be established without forming any obstacle to the relative movements of the trolleys.

The following table indicates the functions of the various elements (relays or amplifiers) of this auxiliary trolley, as indicated by their references in FIGURE 3 of the drawing:

E: Preparation for vehicle entering the compartment.
S: Preparation for vehicle leaving the compartment.
I, P, P': Preparation for arrangement of compartment, odd-numbered or even-numbered side.
ATA: Permission for movement given by trolley A or trolley B.

SI, SP: Control of direction towards odd-numbered or even-numbered compartments.
MI, MP: Amplifiers for reversing the phases on the two speeds.
REI, RAP: Preparation of the return control after disposal on the odd-numbered or even-numbered side.
RAI, RAP: Control of slowing-down of movement towards the odd-numbered or even-numbered compartment.
AR: Control of complete stoppage.
ATV: Permission (no control of the jacks).
ATAS: Permission by lift.
PV, APV: Control of idling speed.
PH, PB: Control of movement of platform "from the top downwards" or "from the bottom upwards" and recording of end-of-travel.
MH, MB: Amplifiers for the upward or downward movement control.
FC, MV: Control of movement of jacks at the back of the compartment.
FA: Checking of the movement of the jacks.

In addition to these combinations of fixed coils and relays associated with the movement orders, there are provided safety devices intended to prevent any movement being carried out as long as the members concerned are not in the precise position required. Thus, there is a kind of permission for the following movement, which is given by the member which has carried out the previous movement, when the latter is completely terminated. The safety devices in question are generally effected by the flux of two coils in coincidence controlling or locking the operation of the static relay. The principal safety devices provided in this arrangement are as follows:

Permission given by trolley B for the lift to move by the relay AT–AS (FIGURE 3), excited by the coil 15 of the lift in coincidence with the coil 14 of trolley B.
Permission for the upward and downward movement of the jacks given by PH or PB, excited by the coil 18 of the platform in coincidence with the end-of-travel receiving coil 16 or 17 (FIGURE 3).
Permission given by trolley B to trolley A (FIGURE 2) to begin a movement, given by the relays $AT_1$ and $AT_2$ excited by the emitter coil 19 of trolley B in coincidence with the receiving coil 20 of trolley A.
Permission given by trolley A to trolley B to begin an entrance movement into a given compartment by the relay ATA (FIGURE 3) excited by the coincidence of the emitter coil $19^B$ of trolley A and the receiving coil $20^B$ of trolley B.
Checking by trolley A, due to absence of current, of the definite stopping of the motors of trolley B, by the coincidence with the emitter coil 22 of trolley B (FIGURE 2) and the receiving coil 21 of trolley A, which, for this reason, leaves the relay VB at rest.
Locking of the rest position of the motors of trolley A upon failure of current by the relay VA (FIGURE 3) resulting from the coincidence of the emitter coil 22″ of trolley A and the receiving coil 21″ of trolley B.
Similar locking upon failure of current, of the stopping position of the motors of trolley B by the relay FR (FIGURE 3), controlled by the coincidence of the emitter coil 22‴ with the receiving coil 21‴, both on trolley B.

It has not been considered necessary to show on the accompanying drawings the mechanical braking system ensuring the locking of the driving members and controlled by the relays VB, VA and FR. These electrobrakes may be of any appropriate known type; for example, disc brakes applied by a spring when the electromagnet is not energised by a current.

The device thus constituted will be better understood by the description of its operation which will now be given, with the assumption of a "vehicle-entry" cycle intended to place the vehicle in the compartment C (FIGURE 1) that is to say on the right-hand side of the lift and in the odd-numbered row. It has been assumed in this example that the necessary orders for the emitter floor coils have been given by the control panel which will be described later. With this assumption, the fixed emitter coils $5^E$ and $5^D$ of the floor in question, together with the coil 7 of the compartment selected (FIGURE 2) are also excited for trolley A, the fixed emitter coils $10^E$ and $10^I$, together with the central coil 12 and the coil 13 at the back of the compartment (FIGURES 1 and 3) connected electrically to the coil 7, are excited for trolley B. It will be recalled that the emitter coils of the trolley and the platform are supplied continuously. For the sake of clearness in the explanation which follows, the operations of loading on the lift and the control of the lift have not been described, these operations being dealt with in a subsequent part of the present description.

When the vehicle loaded into the lift has reached the floor required, the trolley A, carrying trolley B, is located in its waiting position facing the lift cage. The trolley A remaining stationary, the first operation is the taking-up of the vehicle in the lift by the trolley B so as to bring it on to trolley A by a transverse to-and-fro movement. At that moment, the relay SP which corresponds to a movement order towards the even-numbered compartments (since the lift is assumed to be in the even-numbered side in this case) comes into operation, the AND function of the lower horizontal input line (P′+$\overline{SI}$) being satisfied since through the intermediary of P′ there are given the permission of the lift ATAS, the indication of the cycle E and the permission of the platform (lowermost position of jacks) PB, and since $\overline{REP}$ and $\overline{S}$ are at rest. At this moment furthermore, the other horizontal AND order lines of SP are not satisfied, since they do not possess the ATAS function which is essential (permission to pass into the lift) nor the ATA function which is the permission of trolley A and which has disappeared.

Thus, SP comes into operation (with SI blocked) and delivers to the amplifier MP (the function $\overline{VA}$ at rest being satisfied), so that the driving motors of trolley B are set into motion at high speed by means of the contactor RP. It should be observed that at that moment, SP is locked in the working position by $\overline{AR}$ (stopping relay) which is at rest.

When the receiving coil 11′ of trolley B passes in front of the emitter coil 12 inside the lift, the slowing-down relay RAP triggers over to the working position and remains locked in that position by SP, which is still in the working position. It also triggers over to the working position the idling speed relay PV, whose input AND function of the upper input line (SP+RAP) is satisfied. This has the effect of exciting, through the intermediary of the amplifier APV (the function $\overline{VA}$ of rest being satisfied), the contactor of the idling speed motor, while simultaneously interrupting the high-speed circuit GV. A braking action results and trolley B then moves at a very slow speed. When the receiving coil 11 of trolley B reaches the emitter coil 12 of the lift cell, the relay AR triggers over to the working position and RAP, which until then was locked by SP in the working position, also falls back into rest; however, AR is locked at the same time by the AND functions of $\overline{RAI}$ and $\overline{RAP}$ which are both at rest (slowing down even and odd-numbered sides). SP having passed to the position of rest, the driving members are stopped. The trolley B is thus stopped at the back of the lift cell, its jacks being still in the bottom position.

It should be observed that $\overline{AR}$ in the rest position had previously excited the relay TA by association in an AND function with PV. But TA is a time-lag relay, and retains its order in memory for the duration of the time delay. When AR passes to the working position, the conditions are satisfied and CA should give permission to the trolley A to start its movement. However, as trolley B is not on trolley A, there is no coincidence of the emitter coil 19 and receiving coil 20 (FIGURE 2) so that the movement of trolley A does not take place.

As trolley B is located at the back of the compartment (in the present case the lift cabin), the movement of the platform (upward or downward) can be effected, but before this, the relay FR, actuated by the coil 21''' will verify through the coil 22''' that the supply circuits of the motors are interrupted.

At the back of the lift compartment, as also at the back of all the parking compartments, is mounted a fixed emitter coil 13 which, in this stopped position is located opposite the receiving coil 13' of trolley B. This coil 13' excites the relay FC which serves to control the jacks and which rocks into the working position in which it is locked by one or the other of the return relays REI or REP through the intermediary of the relay MV, so that FC delivers the signals MH (movement of the jacks upwards) and MB (movement downwards). However, the amplifier MB only is energised by current because at that moment PB only is excited and not PH; the coil 16 being opposite the emitter coil of the platform 18, PB remains in that position, locked by MV, while PH is not excited and is in the position of rest. For this reason, the platform rises and lifts the vehicle until the emitter coil 18 is opposite the receiving coil 17.

When the two relays PH and PB are excited at the same time, the movement of the jacks stops. In fact, the amplifiers MH and MB are each controlled by an AND function which comprises a prohibition $\overline{PH}$ or $\overline{PB}$ so that when PH and PB are in the working position, neither of these amplifiers is operative, and the motor of the jacks stops, the platform being at its upper position.

It will be noted that the third working output of PH and PB is connected to an auxiliary unit such as, for example, MU/PH or MU/PB. This is a device by which there can be obtained three supplementary outputs, such as P'+ATV+MB (or MH). It is easy to see that both PH and PB are locked by two OR functions derived from the relay MV (jack movement) or by their opposite relay in the position of rest.

The relay MV is controlled by an OR order obtained from REI or REP (even or odd numbered return). In the present case, it will be REI which receives an order from P' (a special relay operative for entrance to the lift). MV thus locks PH and PB, together with FC which is the relay actuated by the coil in the back of the compartment. This is a safety device, since normally when the trolley B is stopped at the back of the lift cabin (or of a compartment) during the movement of the jacks, FC receives a permanent and continuous order, but in the event of accidental interruption of the supply circuit of the fixed coil of FC, the cycle would continue normally.

PM and PB having changed over to the working position, actuate the relay ATV (permission for jacks) by an AND order, the relay ATV changing to the working position and being locked by the relay PV of the main driving system of trolley B at rest. This latter gives an order to SI or SP to operate, depending on the case.

It is found however that on SP and on SI, ATV only affects the third AND line, which is the only one which gives the return orders. But only SI (return towards the odd numbers) is operative since REI (return to the odd numbers) controlled by P' is put in the working position, $\overline{REP}$ and $\overline{SP}$ being at rest. For this reason, trolley B can carry out the return order transmitted by REI; SI changes over and controls the starting-up through the amplifier MI for the return of trolley B at high speed, in the opposite direction to that preceding, which was controlled by SP.

When the coil 11'' passes in front of the coil 12 of trolley A, the relay RAI (slowing-down towards the odd numbers) changes over and sends an order to the relay PV through the lower horizontal line of this latter. The AND function resulting from SI+RAI being satisfied, PV changes over and excites the amplifier APV which starts up the motor at low speed by the contactor 23, in the same way as previously indicated for slowing down on the outward journey; RAI is held locked in this working position by the order coming from SI, and the slow speed return movement continues.

At the same time, the relay PV delivers towards a special relay TA (similar to the others but with a time lag) which rocks over and supplies, during the period of this time delay when the function AR at work is obtained by means of the amplifier CA, the current necessary for the coil 20 which is concerned with the eventual permission for movement of trolley A. Trolley B thus continues its return movement on to the trolley A. The receiving coil 11 comes into coincidence with the emitter coil 12 carried by trolley A. Trolley B then stops, since the relay AR changes over and SI is no longer energised. SI and RAI being in AND function on PV, the latter moves back to its rest position and the movement ceases. However, the locking of RAI on AR subsists because SI no longer locks RAI and the latter falls back into rest.

Thus, trolley B carrying the vehicle, has returned on to trolley A, the platform carrying the vehicle being at its upper position. Permission for movement is immediately given by the time lag relay TA to trolley A; as this permission only takes effect when AR has changed over, the coincidence of the coils 19 and 20 is a first check of the correct position of trolley B on trolley A. This check is furthermore duplicated by that of the relay PCA on trolley A, controlled by the receiving coil 21 in coincidence with the emitter coil 22 on trolley B.

It is well to note that the relays having recorded the orders issued at the outset from the central control panel, have all fallen back and are ready, on their return, to receive new orders.

In fact, the relay E (or S in the case of an outgoing vehicle) is locked by $\overline{PV}$ (reduced speed) at rest, which condition has disappeared because of the slowing-down of trolley B. The relay I (and P in the case of an even numbered compartment) is locked by RAI and RAP as a function of the slowing-down at rest. This condition has also been eliminated.

The relay VA at rest (checking of the motors off-voltage) which conditions the three high and low-speed amplifiers of the lateral movement motors of trolley B is the indication, by the coincidence of two coils, one 22''' on trolley A and the other 21''' on trolley B, that the motors of trolley A have actually stopped, as the relay VA is not excited. This doubles the safety feature of ATA (permission from trolley A to put trolley B in movement).

Trolley B has thus returned to its position on trolley A and the latter can start-up since trolley B gives it permission to do so by TA–CA.

Trolley A having received permission from trolley B can begin its movement towards D. The central control has now energised the fixed emitter coils $5^E$ and $5^D$; the latter has excited the receiving coil $6^D$ of trolley A and has actuated the relay D (FIGURE 2). The relay SD receives the signal from D and can change-over since the AND function of the central horizontal input line is satisfied because $AT_1$, E and D are all three operative and since $\overline{SG}$, $\overline{S}$ and $\overline{G}$ are in the position of rest. By its changeover, relay SD locks RAD (slowing-down relay) which, being in the position of rest, locks D. SD is also kept locked because $\overline{AR}$ (stopping relay) is in the position of rest. Being in the working position, SD delivers toward the amplifier MD which ensures the movement of trolley A at high speed in the direction D (FIGURE 1) by the action of the mechanical contactors RD and GV. This movement is effected without hindrance since the AND function: PCA in the working position and $\overline{VB}$ in the position of rest, is satisfied.

The movement of trolley A continues in the direction D until it arrives opposite the compartment in which the vehicle is to be garaged. At the moment when the coil 8" of the relay RAD passes into coincidence with the compartment coil 7 (FIGURE 2), RAD changes over and is locked in that position by SD which in turn remains locked in the working position until the trolley has completely stopped. D is no longer locked and falls back into the position of rest; but PV is energised and changes over to the working position, exciting the idling speed contactor PV through the intermediary of the amplifier APV, which interrupts the circuit of the high-speed contactor GV. Trolley A then continues its movement at low or idling speed, until the coil 8 of the stop relay AR is opposite the compartment coil. At that moment, AR changes over to the working position, so that it no longer acts towards CB, thus giving permission for movement to trolley B by the coil $19^B$; SD is unlocked and returns to the position of rest, together with PV and E. The movement stops completely.

It should be observed that, from the beginning, the relay D has in a way set the return relay REG, which will be required to play its part later, this relay remaining locked in this position by RAG which is at rest, as will be explained later.

Trolley A being stopped and having given permission for movement of trolley B, the latter passes into the selected compartment so as to place in it the vehicle to be garaged, under conditions similar to those described above for the entering and leaving the lift. But the entry into this compartment, which is odd-numbered in the present example, is effected by control of the relay I which has recorded the orders received from the fixed emitter coil $10^I$. It is the relay SI which, through the intermediary of the amplifier MI, will set into operation the driving members of trolley B in the direction of movement towards the odd numbers, at high speed. The slowing-down operations by the relay RAI and stopping by the relay AR are carried out, with the appropriate changes, as has been described above for slowing down and stopping in the lift. However, as the entering platform (loaded with the vehicle) is in the upper position, it is the downward movement (relay MD) of the jacks which will be controlled at the back of the compartment, in order to place the vehicle on the supports in the compartment. The platform having moved down to the bottom position, trolley B will then take-up its position on trolley A in the same way as previously described.

At this moment, the permission for movement of trolley A may be given by trolley B by means of the coils 19 and 20, combined with the relay $AT_1$ (FIGURE 2) and trolley A will move automatically towards the left in order to take-up its waiting position again.

The slowing-down takes place under the same conditions as previously indicated for the outward journey, when the coil 8' of trolley A comes opposite coil 7, but this time through the intermediary of the slowing-down relay RAG and of the low-speed relay PV. Stopping is effected by the relay AR when the coil 8 comes opposite the corresponding coil 7 of the lift compartment, under the same conditions as the stopping previously described in front of the compartment allocated to the vehicle.

Thus, trolley A, having completed its operation is again located, carrying trolley B with its platform in the bottom position, at its initial place, namely its waiting position, ready to carry out a new mission.

In the case of an outgoing cycle, that is to say when it is required, starting from its waiting position, to go to fetch a vehicle in a compartment, to take it down and pass it back to its user, operations similar to those described above would be carried out by the action of the relays concerned, but in a different order.

The control of the operations which enable the vehicles to be brought to each floor in order to carry out there the movements described above, could be effected in various ways. It will however be advantageous to effect this in the manner which will now be described.

In this form of embodiment, it is provided that the control of the whole of the movements for an entering or leaving vehicle is effected by means of a control apparatus which comprises for each floor a distributor of control plates or "keys," each corresponding to a predetermined compartment. The operation of extraction of a control key from the distributor serves at the same time to give all the electrical orders necessary for the series of entering movements of a vehicle.

This operation is carried out in two stages, the first stage corresponding to the passage of the key which is provided with a certain number of holes or slots corresponding to a compartment, in front of lamps which send illumination through these holes or slots to photoelectric cells coupled to the relays controlling the movements to be carried out in order to convey the vehicle into the compartment selected; while the second extraction stage corresponds to the complete freeing of the key which is handed to the owner of the garaged vehicle. In order to control the bringing out of a vehicle, its proprietor inserts his key in the upper portion of the distributor, which comprises a combination of photoelectric cells, similar to those for an entering vehicle. Thus, the simple action of taking out a key, or putting back in position the said key, is sufficient to control automatically the whole of the movements of entering and leaving.

An arrangement of this kind has been shown in FIGURES 9 and 9b of the accompanying drawings. In the casing 30 corresponding to the floor considered, are stacked the keys of the free compartments on that floor. These keys are shaped as shown in FIGURE 9b, namely they are composed of a small plate 29 which comprises on its periphery a certain number of holes or preferably slots located on its edges, such as I, D, a, b and c, which correspond to the movements to be controlled for an entering or leaving vehicle.

The slots corresponding to the compartment concerned have been shown in full lines and the slots which would be formed on the other keys of the series for this same floor have been shown in dotted lines. When the lower key 31 is removed from the stack (FIGURE 9) for example by means of a push-button of any kind (not shown), the key takes up the position 31 at which it is momentarily stopped by a notch or the like. It is then located between a series of photoelectric cells 32, corresponding to the total number of slots possible, and a series of sources of light 33. The cells are connected through the intermediary of amplifiers to relays of the same kind as those described above (FIGURE 4) which in turn control, through the intermediary of contactors, the supply of alternating current to emitter coils of the floor. At the moment when the key reaches the position 31, the lamps 33 light up and the cells 32 transmit the desired impulses for the whole of the movements of entering and transfer of the vehicle to the compartment corresponding to that key.

In order to bring out a vehicle, the key is pushed into the intermediate position 34 at the top of the apparatus which has the effect of lighting the lamps 35 which irradiate the cells 36 which are connected to the relays controlling the emitter coils. The key is then pushed fully home and falls into the distributor 30, to correspond from that time on to a free compartment. In this way, the distributor always contains all the keys corresponding to free compartments and only these free keys.

Figure 11:
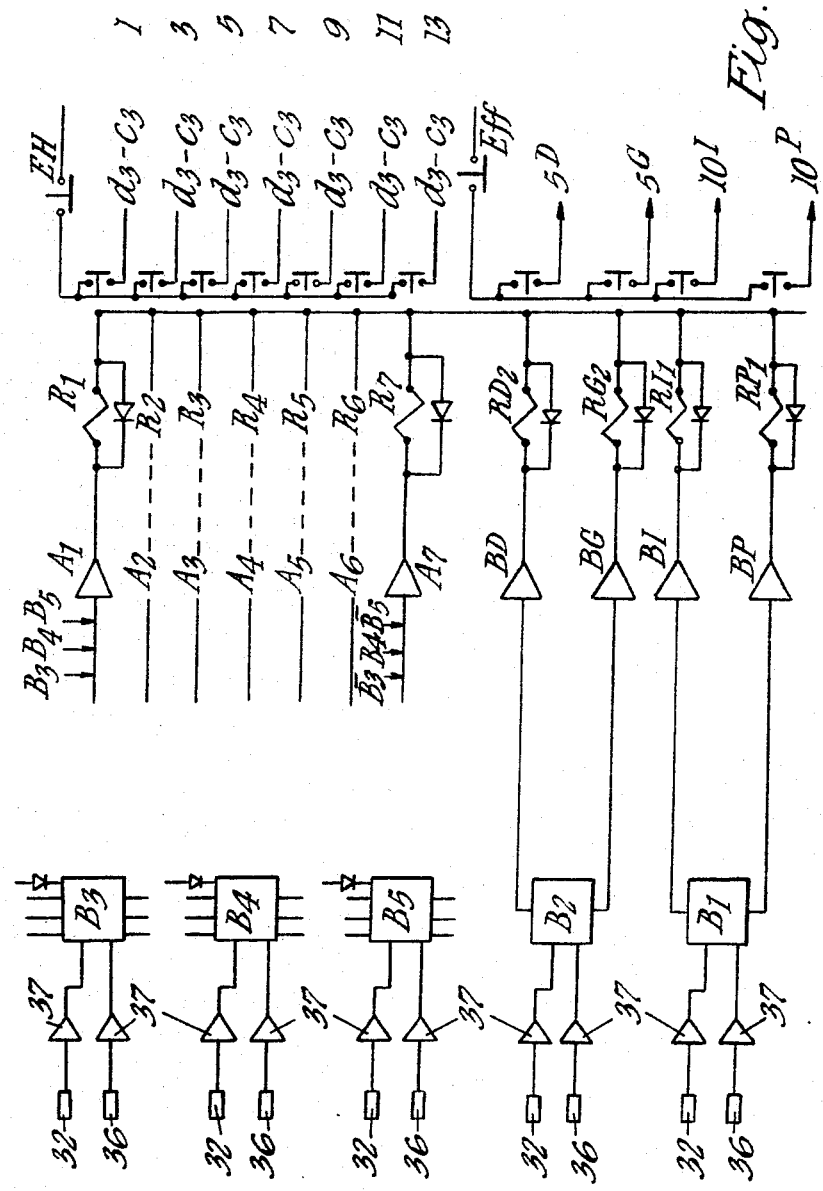
FIGURE 11 is a diagram of connections between the automatic control panel and the emitter coils of the floors.

Referring to FIGURES 10 and 11, it can be seen how the control diagram is prepared which couples the panel appropriate to one floor to the compartment elements of that floor. It has been assumed that the lift 1 serves 28 compartments divided-up into four groups of 7 (FIGURE 10) odd and even numbers, right-hand and left-hand.

An arrangement of this kind has the advantage of reducing the number of relays to a very small total. In fact, only five static relays such as that shown in FIGURE 4 are required to provide the 28 combinations, as can be seen with reference to FIGURE 11, these relays being associated as follows:

$B_1$ (entering and leaving) __ Working, odd compartments BI
Rest, even compartments BP $B_2$ (entering and leaving) __ Working, right-hand comments, BD
Rest, left-hand compartments, BG Giving any one of the 7 compartments of any group, according to the combinations of the following table:

$B_3$ (entering and leaving) __ (1) $B_3$ $B_4$ $B_5$
$B_4$ (entering and leaving) __ (3) $B_3$ $\overline{B_4}$ $\overline{B_5}$
$B_5$ (entering and leaving) __ (5) $\overline{B_3}$ $B_4$ $B_5$
(7) $\overline{B_3}$ $\overline{B_4}$ $B_5$
(9) $B_3$ $B_4$ $B_5$
(11) $B_3$ $\overline{B_4}$ $B_5$
(13) $\overline{B_3}$ $B_4$ $B_5$ Each relay $B_1$ to $B_5$ can be excited by means of an amplifier 37 when a key is operated, either for entering or for leaving.

The working or rest positions of the relays $B_1$ and $B_2$ determines one of the four groups of 7 compartments and the combination special to each key of the relays $B_3$, $B_4$ and $B_5$ determines a single compartment selected from the group chosen by $B_1$ and $B_2$.

It will be observed furthermore that the presence of a slot or hole in the key corresponds to the excitation of a photoelectric cell (that is to say to the changeover of the corresponding relay to the working position), while the absence of the hole or slot in this same position corresponds to absence of excitation of the cell (namely to the rest position of the relay). Under these conditions, only four slots or holes as a maximum will be required for all cases in order to select that of the 28 compartments which corresponds to the key.

Thus, if for an entering order there is extracted from the distributor apparatus, the key of FIGURE 8 comprising the slots I–$a$ ($a$ corresponding to the relay $B_3$) the orders executed by the apparatus equipped as indicated in FIGURE 11 will be as follows:

The cell 32 excites $B_1$ by reason of the existence of the slot I on the key, through the intermediary of a preamplifier 37. $B_1$ changes over to the working position and thus supplies the amplifier BI and thereby closes the circuit of the coils of the odd numbered compartments by the contactor $RI_1$. Simultaneously, as the cell 32 of the relay $B_2$ has not been excited since the key has no corresponding slot, the relay $B_2$ has remained in the rest position and supplies the amplifier BG, closing the circuit of the left-hand compartments. Under these conditions, the relays $B_1$ and $B_2$ have selected the group of the left-hand odd-numbered compartments, namely the compartments 1–3–5–7–9–11–13 (FIGURE 10).

As the keys only comprises the slot $a$, the compartment relays are in the position $B_3$, $\overline{B_4}$, $\overline{B_5}$, so that it is the compartment 13 which is selected.

It can thus be seen that the circuits are closed of the emitter coils which control the movements of trolley A either to the right $5^D$ or to the left $5^G$, in the manner previously described with reference to FIGURE 2, and also of the emitter coils which control the transverse movements of trolley B towards the compartments either odd $10^I$ or even $10^P$, in the manner described with reference to FIG. 3.

In addition, the movement of extraction or insertion of a key establishes, by any appropriate means (not shown, for example by the slide serving for the extraction or insertion) the contacts closing the circuits of the emitter coils $5^E$ and $5^S$ acting through the receiving coils $6^E$ and $6^S$ on the relays E and S of trolley A; and the circuits of the emitter coils $10^E$ and $10^S$ acting through the receiving coils $9^E$ and $9^S$ on the relays E and S of trolley B.

Furthermore, when a key is extracted from the magazine, which always corresponds to an entering operation, or when it is inserted, which corresponds to a leaving operation, the photoelectric cells 32 (entering) or 36 (leaving) respectively close the circuits of the fixed emitter coils $5^E$ (FIGURE 2) and $10^E$ (FIGURE 3) or $5^S$ (FIGURE 2) and $10^S$ (FIGURE 3). In order to simplify the drawings, these connections have not been shown in FIGURES 2 and 3.

Finally, one of the contactors $R_1$ to $R_7$ (FIGURE 11) has closed the circuit of the emitter coils 7, 12 and 13 of the compartment concerned, the function of these coils having been previously explained with reference to FIGURES 2 and 3.

The corresponding orders are thus recorded by the static relays corresponding to these coils and the entering or leaving cycle can commence immediately.

There will now be described the entering or leaving apparatus for a vehicle situated on the ground.

In the first place, it is to be observed that the essential principle of a mechanical garage is to be able to arrange the vehicles at a very short distance from each other. The entrance of the lift is thus very narrow. It is necessary to avoid requiring users to carry out operations which are difficult for some and disagreeable for all, namely those involved in the user himself putting his vehicle into the lift.

Furthermore, it is essential to immobilize the lift platform as little as possible, both for incoming and outgoing vehicles.

In order to obtain this result, there has been provided a platform 27 composed of U-section members, on which a vehicle can roll easily (FIGURE 6). This platform is provided laterally with rubber pads which serve to guide the vehicle.

Finally, under this platform there is normally located a trolley B in the waiting position, which operates exactly as has been previously described, but which runs directly on the ground.

It will be this trolley B which lifts the vehicle, introduces it into the lift and then returns to its initial position.

The entrance of the platform is protected at its two extremities by a barrier 30 on the entrance side and by a barrier 30' on the side of the lift 1.

When the platform is free, the entrance barrier 30 is open and the other 30' is closed. When a vehicle enters, the entrance barrier 30 recloses and thus gauges the length of the vehicle.

In fact, by means of appropriate contacts, the key distributor is only unlocked when the barrier is fully lowered. A movable horizontal arm may also be associated with this entrance barrier for the purpose of checking the height of the vehicle, including its possible load.

The exit of a vehicle can be effected either by this same platform 27 or by a similar platform 29 situated opposite, if the possibilities of space so permit. If there is only one platform 27, this serves both for the entrance and the exit and both series of operations will be effected by the same trolley B.

Under these conditions, the controls of the lift are operated as follows; they can be reduced to two cycles:

*Vehicle entrance*

(1) The calling of the lift from the ground is obtained by the closure of the arrival barrier which closes the mechanical contact of a circuit which actuates, through a relay, the downward movement of the lift by the normal control apparatus of the lift.

(2) The order for upward movement to the floor is given by the simple extraction of the key which also closes a circuit which acts through a relay on the proper equipment of the lift. These two orders are successive and are recorded by the usual memory of the lift. They can always be carried out, since the trolleys must necessarily be in their position of rest in order that a key can be extracted from one of the distributors previously described.

Exit of a vehicle

Upon the departure of the trolleys A and B towards the compartment of the vehicle to be removed, the order to move to the floor concerned is given to the lift by the insertion of the key in the distributor. This order is transmitted by a time lag relay with a time delay of 30 to 40 seconds for example, so as to take into account the average time required to carry out the first part of the cycle of removal of the vehicle from the compartment.

When at the end of the cycle the trolley B, after having placed the vehicle on the platform of the lift, has returned empty to its normal position on trolley A, it will give the lift an order to move down to the ground, by means of a relay similar to those previously described, and which will actuate the appropriate contact of the lift.

Signalling and interlocks

The efficiency of the system results essentially from the rapidity of the movement which permit the maximum number of entrances and exits in a given time. It implies signalling and interlocking devices for movements of a general order.

Vehicle entrance

This movement should not be possible from the ground except for a floor at which the trolleys A and B are in their waiting position in front of the lift cage. If the trolleys are in movement, there should be a locking of the key distributor for the floor considered, and eventually another floor must be chosen.

Entry and exit of vehicle

The lift stops when it reaches the floor and is immediately locked during the cycle of operations of trolley B, but as soon as this cycle is completed, the movement of the lift must be freed and the latter is generally returned to the ground floor.

For this purpose, in the first place, it is necessary to verify the movement of presence or absence of trolley A.

In the second case, the movement of trolley B must be checked but after it has completely left the lift.

With reference to FIGURE 7, it can be seen that the emitter coil $b_1$ of trolley A, which is always energised, excites the receiving coil $b_2$ mounted on the fixed frame of the waiting position; coil $b_2$ operates $F_2$.

When a movement takes place, towards the right for example, $b_2$ is no longer excited but $F_2$ remains in the working position due to its locking with $F_6$ at rest.

The emitter coil $b_1$ passes in front of and excites D$a$; $F_6$ passes to the working position, releases $F_2$ and remains locked by $F_2$ at rest. It controls $D_1$ which actuates $T_1$, one of these relays being differential and the other, with a time delay, and it cuts the self-supply alternating circuit of the fixed coils E, S, D, G, having transmitted the orders to trolleys A and B and to the compartment coils.

When trolley A returns, D$a$ is again excited and nothing is changed, but when $b_1$ again passes in front of $b_2$, $F_2$ is changed over to the working position, and $F_6$ falls back since its locking by $F_2$ at rest has been removed.

This results in two functions, $T_1$ (retained by the time-delay) and $F_2$, which cause $F_1$ to change over in an AND function, which interrupts this locking by $F_1$ through an amplifier and a contactor during the time-delay period $T_3$.

When the trolleys are at rest, the coil $b_1$ being in coincidence with $b_2$, $F_2$ in the working position will operate through $S_1$ an indicator lamp on the key distributor, and through $V_r$ when this is at rest (and the trolleys are therefore in movement), the locking of the corresponding key distributor.

The receiving coils $b_3$ and $c_3$ are fixed on the framework in front of the lift cage and are intended to record the movements of trolley B.

On the return travel, their function is as follows: when trolley B passes into the lift compartment, the receiving coil $c_3$ is excited by the emitter coil $b_3$ fixed on trolley B, and then the receiving coil $d_3$. The following cycle is then put into operation:

On the outgoing travel (1) The receiving coil $c_3$ excites $F_3$, locked by $F_4$ in the position of rest;

(2) The receiving coil $d_3$ excites $F_4$ which, in the working position, releases $F_3$ which falls back into the position of rest. $F_4$ operates the differential and time delay relays $V_2$ and $T_2$ which, when $F_4$ has returned to rest, momentarily retain their orders so as to operate in an AND circuit the relay $F'_1$ with $F_3$ when the latter, which is at rest, changes over to the working position.

On the return travel

When trolley B returns on to trolley A, the coil $d_3$ is first encountered by the emitter coil $b_3$. The receiving coil $d_3$ excited $F_4$, already in the working position. The emitter coil $b_3$ then encounters the receiving coil $c_3$ which then acts on $F'_1$ in an AND circuit with $T_2$, as mentioned above.

At the end of the cycle, that is to say when $d_3$ and $c_3$ are no longer excited, the relays $F_3$ and $F_4$ fall back into the position of rest.

$F'_1$ controls a contactor which interrupts the self-supply circuit of the fixed order coils of trolley B, and frees the lift.

I claim:

1. In an automatic mechanical garage having transporting means for conveying vehicles to and from parking places and comprising a lift, a main trolley, and an auxiliary trolley carried by and moveable on and off said main trolley, means for controlling the movements of said lift, main trolley and auxiliary trolley comprising static emitter means, static receiving means responsive by proximity to signals from said static emitter means, contactless relay means electrically connected to and operated by said static receiving means, and driving means for said lift, main trolley and auxiliary trolley electrically connected to and operable by said contactless relay means so as to complete a cycle of parking and unparking operations initiated by a single action.

2. A garage according to claim 1 wherein said receiving means comprise electromagnetic receiving coils, and said emitter means comprise electromagnetic emitter coils.

3. A garage according to claim 1 wherein said contactless relay means comprise transistors in trigger connection.

4. A garage according to claim 1 wherein said contactless relays have a memory device arranged for retaining signals received by said receiving means and for distributing the signals subsequently to said driving means.

5. A garage according to claim 1 wherein said contactless relays have a memory device arranged for retaining signals received by said receiving means and for distributing the signals subsequently to the driving means, and including relays for controlling movement of the transporting means from an initial waiting position and for effecting the return of the transporting means to the waiting position.

6. A garage according to claim 1 wherein said contactless relays have a memory device arranged for retaining signals received by said receiving means and for distributing the signals subsequently to the driving means and including relays for controlling the driving means, and other relays for supplying said controlling relays with a plurality of orders, said other relays being arranged to correspond to prohibitions of permission for operation, and being grouped together in AND functions.

7. An automatic mechanical garage having transporting means for transporting vehicles to and from parking places therein, driving means for said transporting means controlled in response to signals given by emitter means, receiving means arranged to be responsive to signals emitted by said emitter means, relay means for actuating said driving means for driving said transporting means, circuit means connecting said receiving means to said relay means for automatically actuating said driving means in response to said signals, whereby transporting movements of said transporting means can be carried out in response to said signals, said transporting means comprising a main trolley having an auxiliary trolley moveable in a direction transverse to the main trolley, the auxiliary trolley having a vertically moveable support surface for bearing a vehicle, said receiving means being arranged to receive signals from fixed emitter means, and including receiving means arranged to be mounted on the auxiliary trolley and to receive a signal from emitter means, further including receiving means and relays for controlling the movement of the main trolley in response to signals received from emitter means forming part of a group of four fixed emitter means, namely the emitter means of the entry cycle, of the exit cycle, of the right-hand and of the left-hand compartments and also including receiving means and relays for slowing down the main trolley on the right-hand side, slowing down the main trolley on the left-hand side and/or stopping the main trolley, in response to fixed emitter means adjacent to or in compartments of the garage.

8. A garage according to claim 7 and including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley.

9. A garage according to claim 7 and including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, and including first emitter means arranged to be mounted on the main trolley, a relay for recording the stopping of the main trolley and for controlling said first emitter means and corresponding receiving means arranged to be carried by the auxiliary trolley for authorising movements of the auxiliary trolley.

10. A garage according to claim 7 and including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, and including first emitter means arranged to be mounted on the main trolley, a relay for recording the stopping of the main trolley and controlling said first emitter means and corresponding receiving means arranged to be carried by the auxiliary trolley for authorising movement of the auxiliary trolley, including relays arranged to be mounted on the main trolley for recording, from the first movement (beginning of the cycle) away from the waiting position, the orders necessary for carrying out the return movement to the waiting position, but only after the cycle of movement of the auxiliary trolley has been completed with all the interlocks on the one hand and the authorisations on the other.

11. A garage according to claim 7 and including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, and including first emitter means arranged to be mounted on the main trolley, a relay for recording and stopping the main trolley and controlling said first emitter means and corresponding receiving means arranged to be carried by the auxiliary trolley for authorising movement of the auxiliary trolley, including relays arranged to be mounted on the main trolley for recording, from the first movement (beginning of cycle) away from the waiting position, the orders necessary for carrying out the return movement to the waiting position, but only after the cycle of movement of the auxiliary trolley has been completed with all the interlocks on the one hand and the authorisations on the other, also including receiving means and relays for controlling the movements of the auxiliary trolley in response to signals received from emitter means forming part of the group of four fixed emitter means, namely the emitter means of the entry cycle, of the exit cycle, of the odd-numbered compartments and of the even-numbered compartments, and also including receiving means arranged to be mounted on the auxiliary trolley for receiving signals from an emitter means mounted on the main trolley, and from fixed emitter means mounted in compartments of the garage for slowing down the transverse movement of the auxiliary trolley in either direction and for stopping the auxiliary trolley.

12. A garage according to claim 7 and including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, including receiving means arranged to be mounted on the main trolley and emitter means arranged to be mounted on the auxiliary trolley, the receiving means being for receiving signals from the emitter means, one signal to give permission for a movement of the main trolley and another signal to ensure the interlocking at rest of the driving means of the auxiliary trolley, and including first emitter means arranged to be mounted on the main trolley, a relay for recording the stopping of the main trolley and controlling said first emitter means and corresponding receiving means arranged to be carried by the auxiliary trolley for authorising movement of the auxiliary trolley, including relays arranged to be mounted on the main trolley for recording, from the first movement (beginning of cycle) away from the waiting position, the orders necessary for carrying out the return movement to the waiting position, but only after the cycle of movement of the auxiliary trolley has been completed with all the interlocks on the one hand and the authorisations on the other, also including receiving means and relays for controlling the movement of the auxiliary trolley in response to signals received from emitter means forming part of the group of four fixed emitter means, namely the emitter means of the entry cycle, of the exit cycle, of the odd-numbered compartments and of the even-numbered compartments, and also including receiving means arranged to be mounted on the auxiliary trolley for receiving signals from an emitter means mounted on the main trolley and from fixed emitter means mounted in compartments of the garage for slowing down the transverse movement of the auxiliary trolley in either direction and for stopping the auxiliary trolley, further including relays and end-of-travel receiving means to control the upward and downward movements of the driving means for raising and lowering the support surface of the auxiliary trolley, also including a lift, receiving means mounted on the auxiliary trolley for receiving a signal from emitter means provided at the back of each compartment and of the lift for actuating relays controlling the movement of the driving means for raising and lowering the support surface, also including emitter means arranged to be fixed in relation to the support surface and two end-of-travel receiving means mounted one in the upper part and the other in the lower part of the travel of the support surface for receiving a signal from the emitter means and for supplying the control relays for the driving means for raising and lowering said support surface, the latter control relays being arranged to be actuated in an AND function by the orders of a relay controlled by the fixed emitter means at the back of a compartment, and prohibition safety relays, also including control relays for the driving means of the auxiliary trolley, said control relays, being connected so as to be subjected to permission to move given by a relay controlling the definite stopping of the driving means for raising and lowering the support surface of the auxiliary trolley, also including receiving means and a relay mounted on the auxiliary trolley to receive a signal from emitter means mounted in the lift and including further relays arranged to be excited by either of the high or low position relays of said support surface, a receiving means connected to these relays, emitter means fixed in relation to said support surface for influencing said receiving means connected to said further relays, and control relays for the auxiliary trolley driving means, said further relays being arranged to give permission simultaneously in an "AND" function to said control relays for the auxiliary trolley driving means.

13. A garage according to claim 1 including emitter means mounted on the auxiliary trolley for giving a signal to receiving means fixed to the frame of the lift for verifying the final exit movement of the auxiliary trolley from the lift.

14. A mechanical garage having transporting means for transporting vehicles within the garage from an initial waiting position operatively installed in said garage, said garage comprising fixed emitter means for giving signals to said transporting means, a control panel, circuit means for transmitting multiple orders for carrying out a cycle of operations of said transporting means from said control panel to said fixed emitter means, said emitter means being arranged opposite said initial waiting position, said transporting means comprising driving means for driving the transporting means, a control device comprising receiving means arranged to be in proximity to said fixed emitter means in said waiting position of the transporting means and to be responsive to signals emitted by said fixed emitter means, relay means for actuating said driving means for driving said transporting means, circuit means connecting said receiving means to said relay means for automatically actuating said driving means in response to said signals whereby transporting movements of said transporting means can be carried out in response to said signals, wherein said transporting means comprises a plurality of emitter means provided on a floor of the garage for transmitting signals to receiving means mounted on the transporting means, the emitter means lying on a straight line at 45° to the axis of movement of the main trolley of said transporting means which comprises a main trolley and an auxiliary trolley moveable transversely with respect to the main trolley.

15. A mechanical garage having transporting means for transporting vehicles within the garage from an initial waiting position, operatively installed in said garage and comprising fixed emitter means for giving signals to said transporting means, a control panel, circuit means for transmitting multiple orders for carrying out a cycle of operations of said transporting means from said control panel to said fixed emitter means, said emitter means being arranged opposite said initial waiting position, said transporting means comprising driving means for driving the transporting means, a control device comprising receiving means arranged to be in proximity to said fixed emitter means in said waiting position and to be responsive to signals emitted by said fixed emitter means, relay means for actuating said driving means for driving the transporting means, circuit means connecting said receiving means to said relay means for automatically actuating said driving means in response to said signals whereby transporting movement of said transporting means can be carried out in response to said signals, and incorporating a magazine and keys for said magazine such that an operation selected by extracting a key from, and inserting a key into, the magazine automatically initiates and causes to complete a cycle selected from placing a vehicle with a compartment, and removing a vehicle from a compartment, respectively, and incorporating relays coupled to said magazine for controlling the energisation of the fixed emitter means wherein said magazine includes a plurality of photoelectric cells, and means for directing light on to these cells, whereby the placing or removing cycle can be initiated and caused to complete by an operation selected from removing and inserting a key having cut-away portions and full portions adapted to effect the passage of light directed on to individual photoelectric cells.

16. A garage according to claim 15 wherein said keys are inserted at one end of said magazine and extracted out the other end thereof, the garage comprising sensitive elements for recording the movement or orders relative to outgoing vehicles when said keys are inserted, and recording the orders relative to incoming vehicles when said keys are extracted.

17. A garage according to claim 15 and having a central passageway and a waiting position, the compartments being divided into groups located on the odd-or even-numbered side of said central passageway and on the left-hand or right-hand side of said waiting position, the garage comprising contactors connected to emitter means of the group of right-hand and left-hand compartments, and contactors connected to the emitter means of the group of odd-and even-numbered compartments and relays for delivering to said contactors, said magazine being connected to said delivering relays.

18. A garage according to claim 15 and having four groups of seven compartments, wherein said magazine is connected to three relays, in order to select a compartment from a group of seven compartments, the output circuits of these relays, either working or at rest, being connected in groups of three forming AND functions to as many said contactors as there are compartments in the group which in turn are arranged to control the compartment emitter means.

19. A garage according to claim 1 wherein the auxiliary trolley is moveable on the main trolley in a direction transverse to the movement of the main trolley, and including a plurality of emitter means provided on a floor of the garage for transmitting signals to receiving means mounted on the transporting means, the emitter means lying on a straight line at 45° to the axis of movement of the main trolley.

References Cited by the Examiner

UNITED STATES PATENTS

| | | | |
|---|---|---|---|
| 2,077,238 | 4/1937 | Henricks | 214—16.14 |
| 2,529,804 | 11/1950 | Harnischfeger. | |
| 2,656,940 | 10/1953 | Sumners et al. | |
| 2,923,421 | 2/1960 | De Roumefort. | |
| 2,980,264 | 4/1961 | Burt et al. | |
| 3,049,247 | 8/1962 | Lemelson | 214—16.42 |

GERALD M. FORLENZA, *Primary Examiner.*

R. B. JOHNSON, *Assistant Examiner.*